(12) United States Patent
Erramilli et al.

(10) Patent No.: US 8,509,925 B2
(45) Date of Patent: Aug. 13, 2013

(54) METHOD AND SYSTEM FOR GENERATING AN OPTIMIZED SOLUTION FOR A PROCESS

(75) Inventors: Ashok Erramilli, Holmdel, NJ (US);
 Srinivas Netrakanti, Edmonton (CA);
 Erwin Paes, Edmonton (CA); Aditya Kelkar, Avenel, NJ (US); Xi Zhu, Redmond, WA (US)

(73) Assignee: Optessa Inc., Edmonton (CA)

( * ) Notice: Subject to any disclaimer, the term of this patent is extended or adjusted under 35 U.S.C. 154(b) by 1217 days.

(21) Appl. No.: 12/316,854

(22) Filed: Dec. 17, 2008

(65) Prior Publication Data

US 2009/0210076 A1  Aug. 20, 2009

Related U.S. Application Data

(60) Provisional application No. 61/007,956, filed on Dec. 17, 2007.

(51) Int. Cl.
 *G05B 13/02* (2006.01)

(52) U.S. Cl.
 USPC ............................. 700/33; 700/49; 700/108

(58) Field of Classification Search
 USPC ................... 700/28, 33, 36, 49, 50, 108, 109, 700/110
 See application file for complete search history.

(56) References Cited

U.S. PATENT DOCUMENTS

| | | | |
|---|---|---|---|
| 5,897,629 A | 4/1999 | Shinagawa et al. | |
| 6,236,976 B1 * | 5/2001 | Ginsberg et al. | 705/7.22 |
| 6,662,167 B1 * | 12/2003 | Xiao | 706/13 |
| 6,701,223 B1 * | 3/2004 | Rachford et al. | 700/301 |
| 2002/0111780 A1 | 8/2002 | Sy | |
| 2005/0071300 A1 | 3/2005 | Bartlett et al. | |
| 2006/0101052 A1 * | 5/2006 | Netrakanti et al. | 707/102 |

OTHER PUBLICATIONS

"Netaps Archived webpages", www.netaps.com, 2003, obtained using Internet Archive Wayback Machine.*

* cited by examiner

*Primary Examiner* — Carlos Ortiz Rodriguez
(74) *Attorney, Agent, or Firm* — William L. Botjer

(57) ABSTRACT

A method, system and computer program product for generating an optimized solution for a process in a manufacturing under a set of constraints. A solution is evaluated under the set of constraints and first violation metrics and first states corresponding to one or more solution elements are generated, based on at least one constraint. At least one candidate solution is generated from the solution. Thereafter, the candidate solution is evaluated at one or more change-points and the solution elements positioned subsequent to the change points. Subsequently, the candidate solution is accepted based on the acceptance criterion. The selected candidate solution is then evaluated again a pre-defined number of times to generate the optimized solution.

15 Claims, 10 Drawing Sheets

Table 1

| Attribute | Non Moon-roof Car | Moon-roof Car | Non Moon-roof Car | Moon-roof Car | Moon-roof Car | Non Moon-roof Car |
|---|---|---|---|---|---|---|
| Solution Element | A | B | C | D | E | F |
| State | NMR | MR | NMR | MR | MR | F |
| Violation Metric | 0 | 0 | 0 | 0 | X | 0 |

→ Solution elements not evaluated

Table 2

| Attribute | Non Moon-roof Car | Non moon-roof Car | Non Moon-roof Car | Moon-roof Car | Moon-roof Car | Moon-roof Car |
|---|---|---|---|---|---|---|
| Solution Element | A | F | C | D | E | B |
| State | NMR | NMR | NMR | MR | MR | MR |
| Violation Metric | 0 | 0 | 0 | 0 | X | Y |

FIG. 2

Table 3

| First Attribute | White | White | Red | Red |
|---|---|---|---|---|
| Second Attribute | Moon-roof Car | Moon-roof Car | Moon-roof Car | Moon-roof Car |
| Solution Element | A | A | B | B |
| State | 0 | 0 | MR | MR |
| Violation Metric | 0 | 0 | 0 | X |

Solution elements are not evaluated, as the pre-defined attribute does not match the first attribute of the solution element Solution elements are evaluated, as the pre-defined attribute matches the first of the solution element

FIG. 4

Table 4

| | | | | | | |
|---|---|---|---|---|---|---|
| First Attribute | Line 1 | Line 1 | Line 2 | Line 2 | Line 1 | Line 1 |
| Second Attribute | White | Red | Red | Red | Red | White |
| Third Attribute | Moon-roof Car | Moon-roof Car | Moon-roof Car | Moon-roof Car | Moon-roof Car | Non Moon-roof Car |
| Solution Element | A1 | A2 | B1 | B2 | A3 | A4 |
| State | 0 | MR | 0 | 0 | MR | 0 |
| Violation Metric | 0 | 0 | 0 | 0 | X | 0 |

Solution elements are not evaluated, as the pre-defined attribute does not match the first attribute of the solution element Back to back moon roof cars on Line 1

FIG. 6

METHOD AND SYSTEM FOR GENERATING AN OPTIMIZED SOLUTION FOR A PROCESS

REFERENCE TO RELATED APPLICATIONS

This application claims priority of U.S. patent application Ser. No. 10/975,751 filed Oct. 28, 2004 and titled "Method and System for Solving an Optimization Problem" which is incorporated by reference herein.

The application claims priority of U.S. patent application Ser. No. 10/975,877 filed Oct. 28, 2004 and titled "Method and system for sequencing and scheduling" which is incorporated by reference herein.

This application claims priority of U.S. Provisional patent application Ser. No. 61/007,956 filed Dec. 17, 2007 and titled "Method and System for Solving Optimization Problems Using Filters" which is incorporated by reference herein.

BACKGROUND

This invention relates to generating an optimized solution for a process under a set of constraints.

Processes are found in all industries. Various examples of the processes in manufacturing organizations include but are not limited to planning, scheduling, and the manufacture of products on an assembly line. These processes have to be optimized to attain business advantage in terms of cost and efficiency in execution. Further, these processes are usually complex, and depend on a large number of factors such as variable capacities of equipment, multiple stages of manufacture, production of several kinds of products using a single resource, manpower or process limitations, and other factors specific to the manufacturing unit. In other words, there can be a large number of rules/constraints that govern the execution of such processes. A violation of any rule or constraint directly translates into increased operational costs. Therefore, it is important to optimize such processes by adhering to all constraints of the environment.

Conventional techniques for generating the optimized solution for the process include manual and automated optimization methods. Manual optimization methods require human intervention. Further, the degree of optimization obtained in manual methods largely depends on the skills and experience of the person involved, as well as the complexity of the process involved. Furthermore, manual techniques are also time-consuming, cumbersome, and error-prone and result in poor solution quality. Further, manual techniques fail when the process to be optimized increases in size and has a large number of constraints.

Automated techniques utilize a defined algorithm to solve the optimization problem associated with a process. A general class of automated methods for optimization is based on the concept of Local Search (LS) heuristics. This technique covers a range of combinatorial heuristics, such as simulated annealing, genetic algorithm, taboo search and evolutionary algorithms.

One such heuristic is provided in the reference titled "Facts, Conjectures and Improvements for Simulated Annealing", authored by P. Salamon, P. Sibani and R. Frost and published by SIAM Monograph in the year 2002. Another such heuristic is provided in the reference titled "Genetic Algorithms and Engineering Design", authored by M. Gen and R. Chang, and published by John Wiley & Sons in the year 1997. Yet another heuristic is provided in the reference titled "Modern Heuristic Techniques for Combinatorial Problems", authored by Colin Reeves and published by Halsted Press in the year 1993.

Typically, the LS technique generates the optimized solution by making local moves in the space of solutions. In all LS heuristics, an initial set of one or more solutions is generated by a convenient mechanism. Any convenient mechanism can be used because the initial set of solutions need not satisfy any constraints; they can therefore even be generated randomly. LS heuristics systematically refine the set of solutions by making small or local changes. This results in a new set of candidate solutions. The technique for generating these local changes varies according to the LS heuristic used. The set of candidate solutions is then evaluated to determine violations of the existing constraints. Based on an acceptance criterion that varies according to the heuristic used, one or more of the candidate solutions are accepted. This process is repeated until the candidate solutions do not improve appreciably, or a computational budget is exceeded. In practice, obtaining a high-quality solution requires a large number of moves, and the practical utility of the LS heuristic rests on the efficient evaluation of a large number of candidate solutions (of the order of $10^6$ to $10^8$) against numerous constraints.

Conventionally, candidate solutions are evaluated in their entirety. This requires high-speed computers with large storage capacities, and the optimization may not run to completion in the available time. If the evaluation is carried out incrementally (i.e., only in the neighborhoods in which the solution has changed), the method in the current state of the art is specific to a particular constraint and depends on the manner in which the local moves are generated. Thus, if there are K constraint types and L schemes for move generation, there is a need to develop K*L algorithms, along with commensurate software design, development, testing and maintenance effort. Thus, this approach requires extensive software development which is not cost effective and also time consuming. Therefore, it is evident that prolonged computational times and high expenses hinder/limit the practical use of LS heuristics.

Further, in many manufacturing processes it is desired that certain production rules/constraints are applied over certain time intervals, and not over others. Similarly, certain constraints are applicable only to a particular model of an automobile or to a particular assembly line. Currently, the optimization techniques, both manual and automated, fail to optimize a process by selective application of the constraints.

Accordingly, there is a need for a method that speeds up the computational process, along with providing efficient solutions to the processes without any manual intervention. Such method should be cost-effective, error-free, and should be easily implemented on workstations and PCs. Further, the method should selectively apply constraints to generate the optimized solution.

SUMMARY

An object of the present invention is to provide a method for generating an optimized solution for a process in a manufacturing unit under a set of constraints.

Another object of the invention is to provide a method for selective application of one or more constraints for generation of an optimized solution.

Yet another object of the invention is to provide a method, wherein the incremental evaluation of one or more solutions is essentially independent of the nature of the constraints.

Yet another object of the invention is to provide a method, wherein the evaluation of the solutions is independent of the manner in which candidate solutions are generated.

To achieve the objectives mentioned above, the invention provides a method, system and computer program product for generating an optimized solution for a process in a manufacturing unit. The optimized solution is generated under a set of constraints. For simplicity, first consider a LS heuristic in which there is only one candidate solution at each step of the computation, for e.g., simulated annealing. The optimized solution is generated from a solution representing a sequence of one or more solution elements. The solution is evaluated, generating first states and first violation metrics corresponding to each solution element in the solution. Thereafter, a candidate solution is generated by modifying one or more sequence positions in the sequence. Subsequently, the candidate solution is evaluated at one or more change points. The change points represent the sequence positions where the solution elements have been modified. Further, the evaluation is proceeds for one or more solution elements positioned subsequent to the change points. The evaluation leads to generation of new state and new violation metric corresponding to each solution element that is evaluated.

The candidate solution is then selected based on an acceptance criterion. Thereafter, a candidate solution is again generated from the selected candidate solution and is tested again for the acceptance criterion. The candidate solution is accepted after a pre-defined number of iterations. The selected candidate solution after a pre-defined number of iterations is the optimized solution for the process. Further, the method also selectively applies the constraints for the generation of the optimized solution.

This description can be readily extended to LS heuristics in which there are multiple candidate solutions for e.g., Genetic Algorithms (GA) in which at any given computational step there are a population of candidate solutions. New solutions are derived from combinations of the existing set, and the resulting set of solutions can be incrementally evaluated one at a time as described above.

The method described above have several advantages. The method enables the incremental evaluation by integrating the concept of states with the constraint. This enables the incremental evaluation to be independent of the nature of constraints and the manner in which the local changes were made to a solution/candidate solution. This reduces the software development effort for the scenario described earlier of K constraints and L schemes for move generation by a factor of K*L. Thus, this significantly reduces the cost of developing the software. Further, such incremental evaluation speeds up the LS heuristic computation, and enables the optimization of processes within the available time. This is an automated optimization that can run without any human intervention. Furthermore, the optimized solution generated is error-free. The method also enables selective application of the constraints, which is necessary to support the full range of real-world constraints.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 2 depicts an example illustrating the method of evaluation of one or more solution elements for a constraint in accordance with an exemplary embodiment of the invention;

FIG. 4 depicts an example of evaluating one or more solution elements of a solution for a constraint in accordance with an exemplary embodiment of the invention;

FIG. 6 depicts an example of evaluating one or more solution elements of a solution for a constraint in accordance with an exemplary embodiment of the invention.

DETAILED DESCRIPTION OF THE DRAWINGS

Figure 1A:
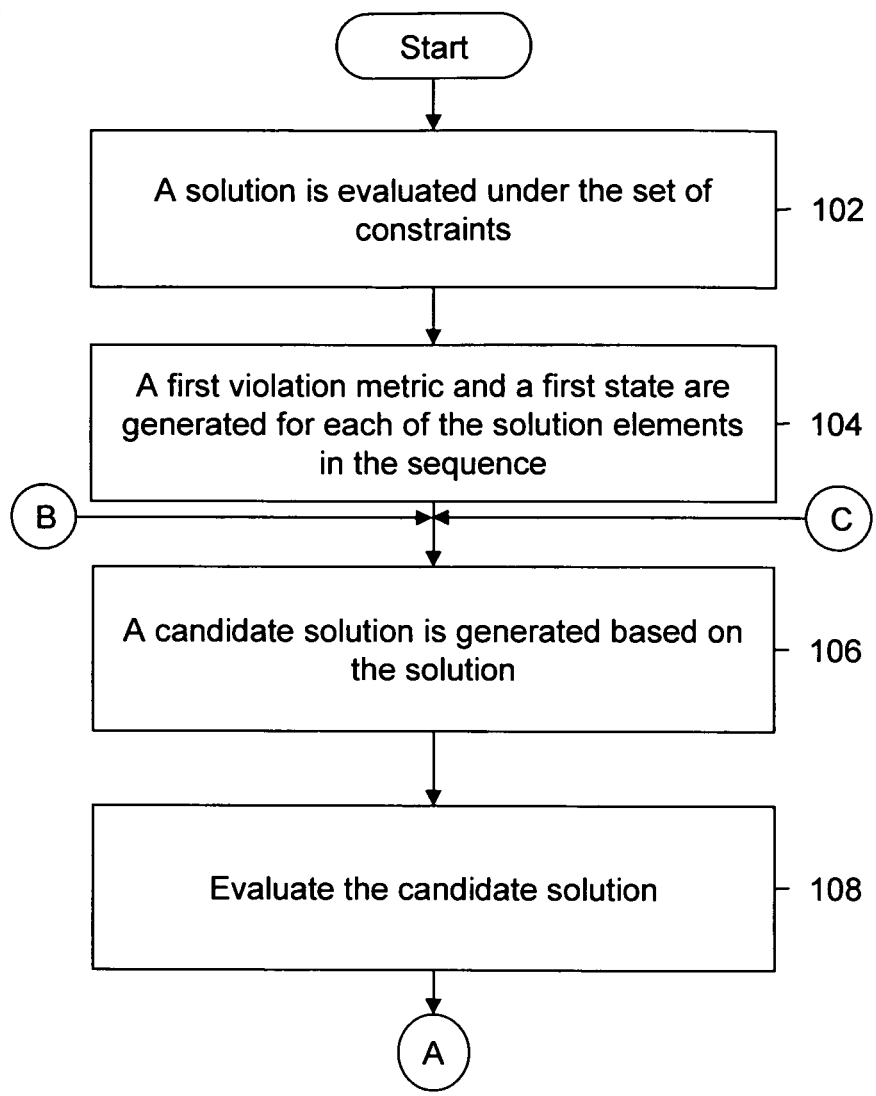
FIGS. 1a and 1b depict a flowchart illustrating a method for generating an optimized solution for a process in a manufacturing unit, in accordance with an embodiment of the invention.

For purposes of clarity, the following terms used herein are defined below:

Process: A process in a manufacturing unit can be defined as a sequence of events or tasks to be performed. Various examples of the process can be assembly line scheduling, distribution planning, vehicle/automaton routing, and the like. In the context of a manufacturing process, a sequence of "jobs" is often the term used.

Job: A job is a unit of production. From a scheduling perspective, a job is an object, an activity, or a process that needs to be scheduled. For example, in the process of 'assembly line scheduling/sequencing for manufacturing 500 cars' each job can be an automobile.

Solution: A solution is a mathematical representation of the process. In other words, the solution for a process, such as the assembly line scheduling is typically represented as a production schedule. Further, the solution represents sequence of one or more solution elements. For example, a solution for scheduling 500 cars on an assembly line is represented as {i1, i2, i3, i4 . . . i500}, where each iN (solution element) represents an isolated event or job in the sequence. A Gantt chart representing assembly line scheduling is an example of such a solution. Those skilled in the art will appreciate the use of Gantt charts to depict assembly line production schedules.

Solution Element: A solution element represents a single job/event in a solution (sequence of the solution elements). For example, the solution can be represented as {i1, i2, i3, . . . , i500}, wherein each 'iN' represents a solution element. Further, the solution is indexed in the sequence by sequence positions. For example, at first sequence position, i1 is the first solution element.

Candidate solution: A candidate solution is an alternate or modified sequence derived from the solution. For example, if the solution is represented as {i1, i2, i3, i4}, then one candidate solution may be {i1, i4, i3, i2}.

Constraint: A constraint is a user-defined rule that the solution should adhere to. For example, assembly line scheduling may have a constraint such as 'No more than twenty cars with leather interior are allowed to be manufactured in a day.'

Objective function: An objective function is a mathematical function which is optimized under a set of constraints to attain an optimized solution.

$$\sum_i w_i \left( \sum_j v_{ij}^{s_i} \right)^{\frac{1}{s_i}}$$

where, $w_i$=weight assigned to constraint i $v_{ij}$=a violation metric, or a measure of violation j of constraint i $s_i$=a severity factor or non-negative exponent assigned to constraint i State: A state is defined at each element of the solution for a given constraint. The state at an element encodes the impact of all other elements on the element for the constraint and represents the status of the solution element with respect to the constraint. For example, if the constraint were a limit on the number of cars manufactured with leather interior in a given day, the state of this constraint for the nth solution element will be the number of cars manufactured with leather interior prior to, for that day.

Attribute: An attribute represents an associated property with the solution element. For example, a car may have associated attributes such as model, variant, color, leather interiors, and the like.

It will be appreciated by those skilled in the art that although the definitions have been provided in the context of manufacturing a set of cars, the embodiments of the invention can be implemented across a wide variety of different processes, both within the context of mass manufacturer and beyond.

Figure 1B:
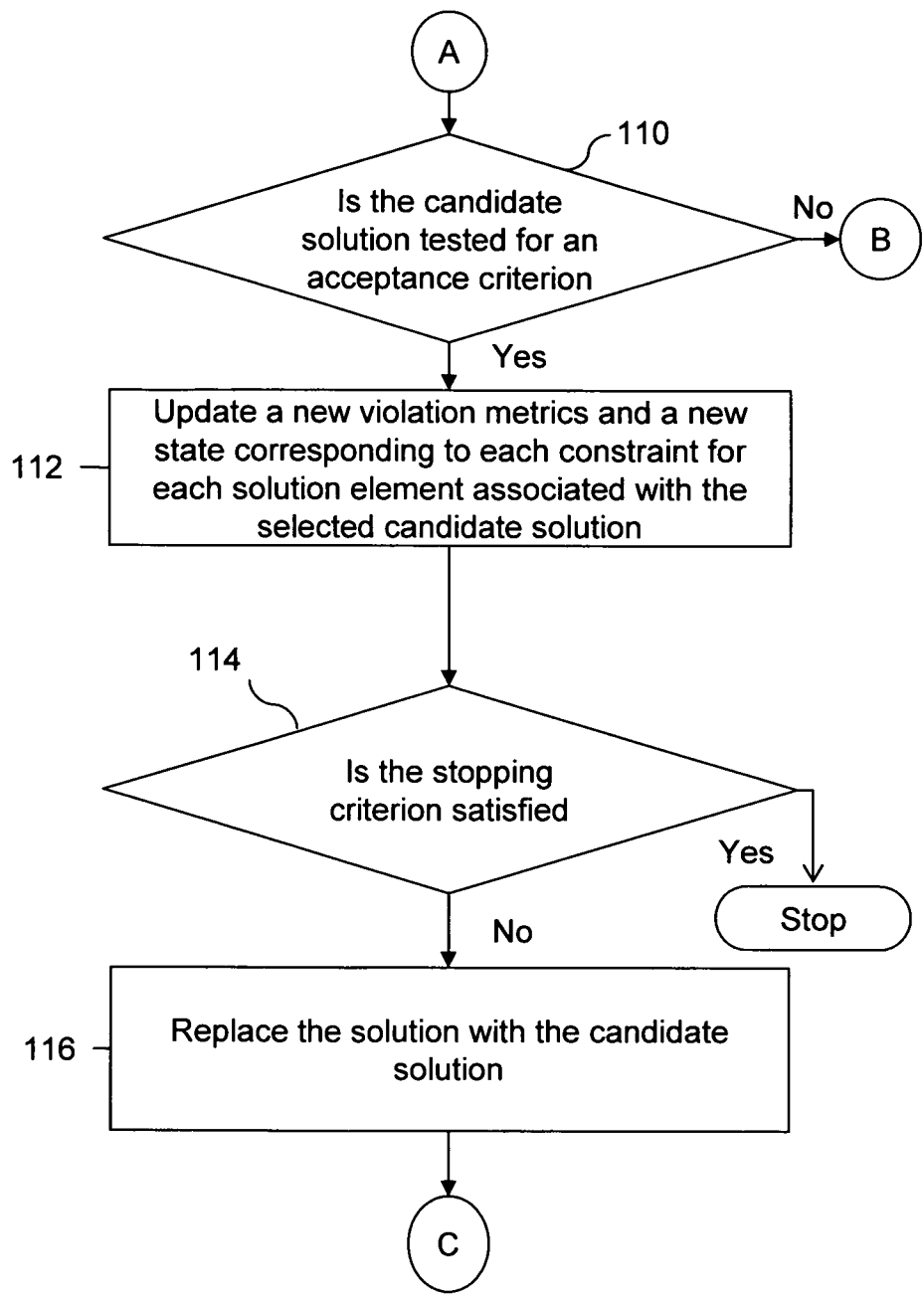

Turning now to FIGS. 1a and 1b, illustrates a flowchart of a method for generating an optimized solution for a process in a manufacturing unit, in accordance with embodiments of the invention.

In various embodiments of the invention, an optimized solution is achieved by iteratively optimizing various candidate solutions derived from an initial solution (or initial set of solutions). The initial solution can simply be a random sequence of solution elements that can be expected to violate a maximum number of constraints. Alternately, simple heuristics can be used to generate the initial solution, for example, those that attempt to satisfy one or two high priority constraints. The main requirement for generating the initial solution is that it is requires minimal computational time. By deriving one or more candidate solutions and iteratively refining the candidate solutions for a pre-defined number of times, a near optimal solution may be achieved.

At 102, an initial solution, herein after referred to as the solution, is evaluated under a set of constraints. The set of constraints are decided based on the sequence that is being optimized. For example, if a solution for an assembly line is being generated, then the constraints considered are the constraints that effect the scheduling/sequencing of the assembly line. Further, as described above, the solution includes a sequence of one or more solution elements. In an embodiment of the invention, the evaluation is performed to check whether each solution element in the sequence adheres to the set of constraints.

In keeping with the example, assume the process is the sequencing of a set of cars (i.e., 500 cars) to be manufactured. Each car may be built with different features (i.e., moon roof, body color, type of interior). A set of constraints may be placed on this process. The constraints may be caused by a wide variety of reasons. For example, a constraint may be "the number of cars manufactured with leather interior should not exceed twenty per day". This constraint may exist because the facility at which the manufacturing is being conducted may only have enough daily inventories of leather interior packages to support twenty or so cars.

Another constraint may be that 'a white color' cannot follow cars painted dark colors. This constraint may be in place because the painting process may contaminate a white color when the applicators switch from dark paint to white paint.

Yet another constraint may be 'back to back moon roofs are not allowed' or 'export cars should be built before Wednesday'. As one can see, there are a seemingly infinite number of constraints that may be defined and implemented. Collectively these constraints can be defined as the set of constraints with which the solutions must be evaluated.

Returning to Step 102, the initial solution is evaluated to check whether it adheres to the set of constraints. That is, whether the array of solution elements and their individual attributes (i.e., the $3^{rd}$ car may come with a moon roof and painted white) adhere to the set of constraints. In various embodiments of the invention, the initial solution is generated by using a pre-defined algorithm. For example, the initial solution may be generated by using a random generation method, or a well-known greedy heuristic that considers only a small number of high priority constraints. It should be appreciated by those skilled in the art that any number of algorithms could be used to create the initial solution and generally any particular algorithm is beyond the scope of the present invention.

At 104, a first violation metric and a first state are generated for each of the solution elements in the solution. In other words, each solution element at the corresponding each sequence position is evaluated for each constraint of the set of constraints. It may be apparent to any person skilled in the art that the solution is represented by a sequence.

A violation metric is a measure of the violation of a constraint to a particular extent. In various embodiments of the invention, the violation metric is a numeric value. In other embodiments, the violation metric may be Boolean (i.e., given a value of '1' when a constraint is violated and a value of '0' when the constraint is not violated.

A state of the solution element as described above represents the status of the solution element. Further, each state for the solution element is calculated based on the state of the solution element positioned prior to the solution element. For example, if a solution element at the $35^{th}$ sequence position in the solution has to be checked whether it is adhering to a constraint, such as, 'cars having leather interiors should not exceed 20 per day', then the state at the $34^{th}$ sequence position in a sequence has to be considered to check the adherence. Therefore, if there are already 20 'leather interior cars' positioned in the initial 34 cars in the sequence, then the state of solution element at the $34^{th}$ sequence position will be '20 leather interior cars' and based on the car at the $35^{th}$ position in the sequence state is updated. Thus, if solution element at $35^{th}$ sequence position is also a 'leather interior car', then the state of the solution element at $35^{th}$ sequence position will be '21 leather interior cars' and if the solution element at $35^{th}$ sequence position car is not a leather interior cars then state of the solution element at $35^{th}$ sequence position for the constraint remains the same as the state of the solution element at the $34^{th}$ sequence position, i.e. '20 leather interior cars.'

It may be apparent that the first violation metric and the first state for each constraint at each sequence position is generated sequentially, i.e. one after the other. In various embodiments of the invention, the evaluation is started with a null state for each constraint and then it is replaced with the first state based on the evaluation.

At 106, a candidate solution is generated based on the solution. The candidate solution is generated by modifying the sequence at least one sequence position.

In an embodiment of the invention, the solution elements at corresponding sequence positions can be randomly swapped in the solution to generate the candidate solution. In various embodiments of the invention, the candidate solution is generated by using mathematical functions, also termed as operators. For example, an operator can be 'a swap function' which generates two random numbers indicating the sequence positions that have to be swapped in the sequence. Similarly, there may be 'an insert function', 'a shift function', and 'a delete function'. It may be apparent to any person skilled in the art that there may be various other ways to generate the candidate solution, in other words, to generate a new sequence.

For example, in a sequence of 500 solution elements, a solution element at the $300^{th}$ sequence position can be swapped with a solution element at the $200^{th}$ sequence position to generate the candidate solution. Further, the candidate solution is a characteristic of Simulated Annealing. It may be apparent to any person skilled in the art that the candidate solution that is generated based on the solution has to be generated by the same pre-defined algorithm which is used for generating the solution.

At 108, the candidate solution is evaluated. The candidate solution is evaluated at a. each solution element corresponding to each change point and b. one or more solution elements positioned subsequent to each change point.

A change point can be defined as a sequence position at which the solution element in the solution is modified, i.e. replaced, swapped, added, deleted, and the like. Following the above example, the change points will be the sequence position 200 and sequence position 300. Thus, the candidate solution is evaluated first at sequence position 200. A solution element at the sequence position 200 is evaluated based on the first state at the sequence position 199. For example, at sequence position 199, the first state corresponding to the constraint 'cars having leather interiors should not exceed 20 per day' is 20, i.e. 199 initial set of cars to be manufactured already includes 20 cars with leather interiors. Further, a first state corresponding to the constraint 'dark colors cannot follow light colors' is 'Dark', i.e. at sequence position 199 there is already a 'dark car'.

Further, if the solution element, i.e. swapped car/job, now at the sequence position 200 has attributes as 'Leather Interiors' and 'White Colored', then a new state corresponding to the constraint 'cars having leather interiors should not exceed 20 per day' will be now 21 and a new state corresponding to the constraint 'dark colors cannot follow light colors' will be now 'Light'. However both the constraints have been violated, hence a new violation metric associated with each constraint will be generated simultaneously. It may be apparent to any person skilled in the art that similarly, a new state and a new violation metric can be generated for any number of constraints.

Thereafter, since the sequence position 200 is altered, it may be apparent to any person skilled in the art that one or more solution elements positioned subsequent to the change point will also have an impact of the new state at sequence position 200. Therefore, an evaluation of the subsequent solution elements (i.e., sequence position 201) is conducted to determine its new state(s) and any new violation metrics as a result of the altered state(s).

The evaluation is stopped when the state(s) in a given sequence position (e.g., perhaps sequence position 215) does not change.

As is known by those skilled in that art, considering classical state machine theory, the evaluation is completely determined by (i) the solution element and (ii) the state at that point. Thus, incremental evaluation proceeds as long as the candidate solution is logically unequal with the solution, or the state and the new state are unequal. For example, if at sequence position 215 a solution element has an original state as 'Dark', and a new state (based on the attributes of the solution element at sequence position 215 and the state of the solution element at sequence position 214) is 'Dark', then the state of the solution element at sequence position 216 will be the same as it were before. Therefore, there is no need to continue evaluation past sequence position 216, as the state of all subsequent sequence positions would be the same as their original states.

As one can see, based upon features of the present invention, if sequence position 200 is altered as the result of generating a candidate solution, computation on the previous 199 elements is not necessary. Furthermore, computation on the subsequent elements may or may not be necessary (or at least limited); depending on the impact the change to sequence position 200 brings to the remainder of the sequence. One skilled in the art will appreciate how this approach provides for more efficiency via reduced computation compared to the conventional optimization techniques.

To complete the example above, evaluation of the change in state(s) of the solution element at sequence position 300 (now swapped with the solution element at the sequence position 200) is necessary in much the same manner as the evaluation of the solution element at sequence position 200. In various embodiments such an evaluation is termed as 'Incremental Evaluation'.

At 110, the candidate solution is tested for an acceptance criterion. In an embodiment of the invention, the acceptance criterion is selecting the candidate solution when a cost associated with the candidate solution is less than a pre-defined cost. In various embodiments of the invention, the violation metric associated with each solution element is considered for calculating the cost. It may be apparent to any person skilled in the art that the cost is generated from optimizing an objective function associated with the process. Calculation of the cost from the violation metrics has been explained in detail in conjunction with FIG. 7.

At 110, if the calculated cost is not less than the pre-defined cost (i.e., the acceptance criterion is not met), then the candidate solution is not selected and a new candidate solution is generated at step 106. If the acceptance criterion is met, then the candidate solution is selected. Subsequently, at 112, the new violation metric and the new state corresponding to each constraint for each solution element associated with the selected candidate solution are updated. In other words, the first states and the first violation metrics are replaced by the corresponding new states and the new violation metrics.

In another embodiment of the invention, the candidate solution is selected probabilistically when the candidate solution has the cost greater than the pre-defined cost. To accept the candidate solution probabilistically a random number is generated. Thereafter, it is checked whether the random number generated is less than $e^{-d//T}$ and if so, the candidate solution is selected.

The method proceeds by determining whether the stopping criterion is met (Step 114). In one embodiment of the invention, the stopping criterion stops the evaluation after a pre-defined number of iterations. In another embodiment of the invention, the stopping criterion stops the evaluation procedure when there is no further improvement in the cost function. The amount of improvement may be a variable function, such as x % improvement over n iterations. Failure to accomplish this iterative improvement would result in the stopping criterion being met.

At 114, if it is determined that the stopping criterion is not met then, at 116, the solution is replaced with the candidate solution selected at 110 and the process of evaluation is carried again from step 106, i.e. a candidate solution is again generated based on the selected candidate solution. These steps, i.e. 106, 108, 110, 112 and 114 are repeated until a stopping criterion is met.

Once the stopping criterion is met, the selected candidate solution is the optimized solution for the process.

In another embodiment of the invention, the LS heuristic used is a Genetic Algorithm. It may be apparent to any person skilled in the art that, Genetic Algorithms work with multiple candidate solutions at any given computational stage. In an exemplary embodiment of the invention, say M=100 number of solutions are generated. Thereafter, steps 102, 104, 106, 108, 110, 112, 114 and 116 are performed for each solution. New candidate solutions are generated from the existing population using well-known operators such as Crossover or Mutation. Once, a new set of candidate solutions are generated, the incremental evaluation as described above can be applied to each of the candidates individually. Subsequently, top 100 candidate solutions are retained.

In other embodiments of the invention, the LS heuristic used is taboo search, and evolutionary algorithms. It may be apparent to any person skilled in the art that Simulated Annealing, Genetic Algorithms, taboo search and evolutionary algorithms are examples of Local Search (LS) Heuristics. In various embodiments of the invention, the solution starting from an initial solution is systematically refined using one of the above mentioned algorithms.

FIG. 2 depicts an example illustrating the method of evaluation of one or more solution elements for a constraint in accordance with an exemplary embodiment of the invention.

An initial solution comprising a sequence of elements: 'A B C D E F'. The sequence represents a series of cars to be manufactured. An optimum sequence or schedule of manufacture is to be determined, provided the user-defined constraint that back to back moon roofs are not permitted. In this example, cars 'B', 'D', and 'E' require moon roofs and 'A', 'C', and 'F' do not. A state corresponding to the moon roof car is represented by 'MR' and a state corresponding to the non-moon roof car is represented by 'NMR'. Following the flowchart described in FIG. 1, at 102 the solution is evaluated for the constraint. Further, as explained the initial state corresponding to sequence position 1 is a 'null state' (not shown in FIG. 2). In other words, given that there are no solution elements prior to the first element, there is no state information that has to be considered for the very first element. Thereafter, a first state and a first violation metric are generated for each solution element in the sequence.

Evaluation starts from the first solution element (A) at the first sequence position. Since, A is a non moon roof car; the state is updated with 'NMR'. Further, the constraint is not violated; hence the violation metric is 'Zero/0'. Thereafter, B is a moon roof car and therefore corresponding first state is updated as 'MR'. Similarly, C and D are also evaluated. However, E is a moon roof car, and the state considered for evaluation of E is the first state of D, i.e. 'MR', therefore the constraint at E is violated, hence, a violation metric (X) is generated and the first state is updated as 'MR'. Similarly F is also evaluated and the corresponding first state and the first violation metric are updated. Table 1 represents the corresponding first states and the first violation metrics corresponding to the solution elements of the solution.

Further, as described in FIG. 1, a candidate solution is generated at step 106. Following the current example, solution element at the second sequence position is swapped with the solution element at the sixth sequence position. Thus, the candidate solution is now represented as 'A F C D E B', F and B being the solution elements at the change points.

F is re-evaluated based on the state of A, and since, the F is non moon roof car, and the first state is replaced with a new state (NMR). Thereafter, C is evaluated based on the state of F. Since, C is a non-moon roof car the new state generated based on the new state of F is 'NMR'. It may be apparent that the first state of C and new state of C remains the same (shown in FIG. 2); hence the evaluation thereafter will provide the same state and same violation metric. Thus, D and E are not evaluated. The evaluation starts at the next change point, i.e. B and the corresponding new state and the new violation metric are accordingly updated. Table 2 details the states and the violation metrics associated with the candidate solution. This process would continue until a stopping criterion was met (i.e., a sequence that did not violate the constraint).

If we can consider a computation event to be a determination of a violation metric, then this iteration required three computation events (determining the violation metric for the $2^{nd}$, $3^{rd}$, and $6^{th}$ event in the solution. Were a prior art approach used, computation would be required to determine the $2^{nd}$, $3^{rd}$, $4^{th}$, $5^{th}$, and $6^{th}$ event in the solution. One can appreciate the efficiency in computation over a number of iterations.

The method described in the FIG. 1 evaluates each solution element irrespective of the attributes associated with the solution element at the change points and the subsequent solution elements positioned after the change point in the sequence. However, there might be a possibility to apply constraints selectively based on the attributes associated with the solution element. Such a method of selective application of constraints is explained in detail in conjunction with FIG. 3, FIG. 4, FIG. 5 and FIG. 6.

Figure 3A:
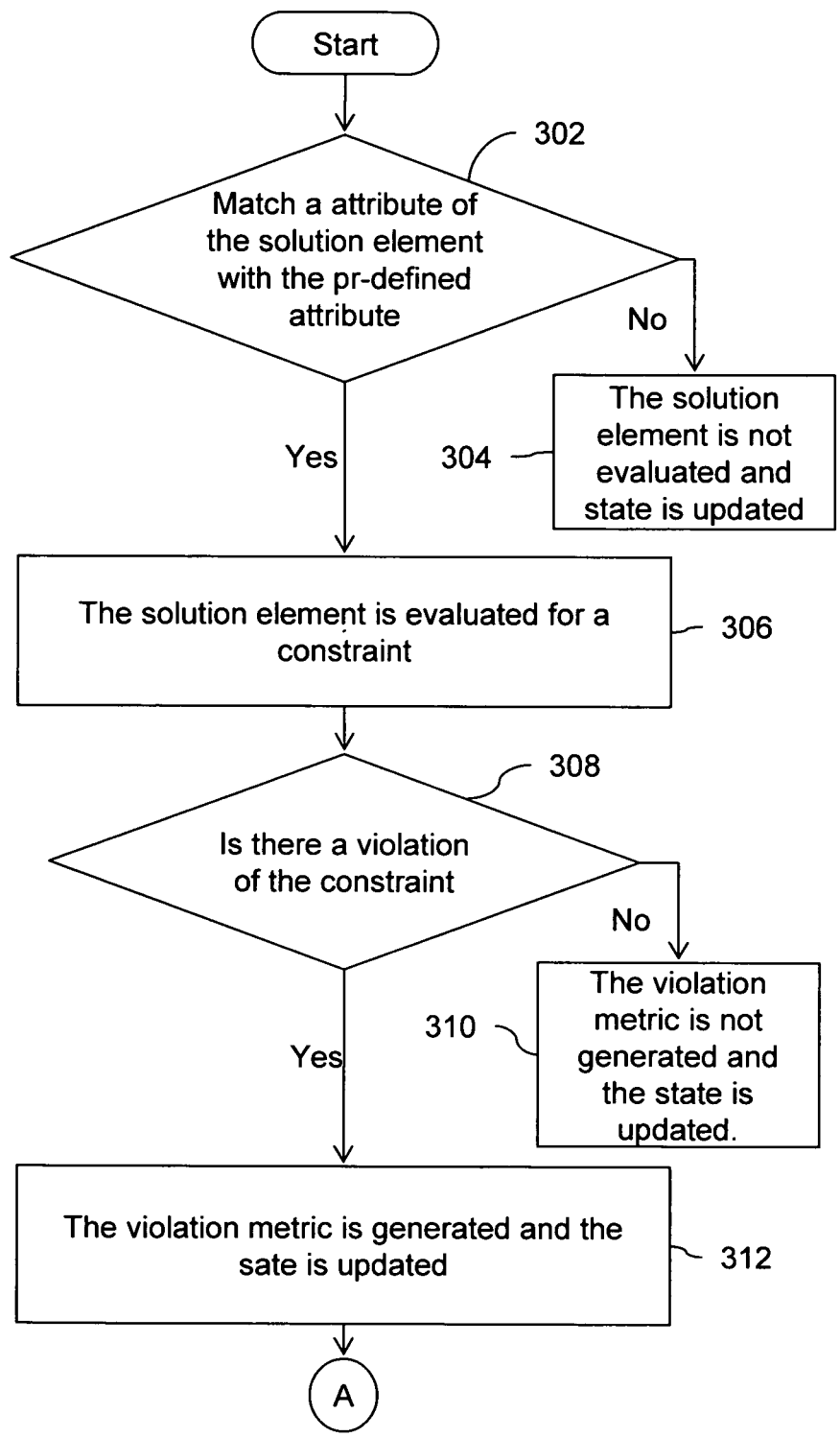
FIGS. 3a and 3b depict a flowchart illustrating evaluation of one or more solution elements of a solution for a constraint in accordance with another embodiment of the invention.
Figure 3B:
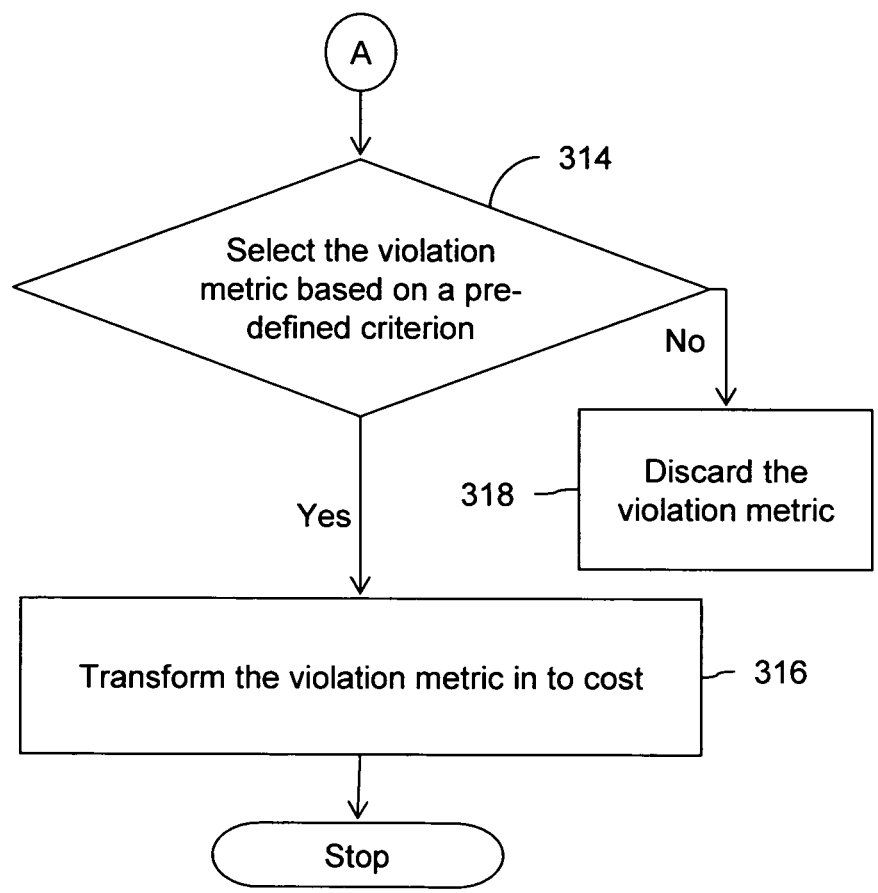

FIGS. 3a and 3b depict a flowchart illustrating the evaluation of one or more solution elements of a solution for a constraint in accordance with another embodiment of the invention.

In various embodiments of the invention, a constraint is selectively applied to a solution element. For example, in a manufacturing unit, a specific constraint is applied to only a specific model of car which is but one of a handful of models to be manufactured in one process. Such selective application of the constraint helps in reduction of unwanted/undesired evaluation of the solution element and thus improves the speed of the evaluation of the solution leading to faster generation of the optimized solution. The method of selectively applying the constraint on the solution element is explained in detail below.

At 302, at least one attribute of the solution element of the solution is matched with a pre-defined attribute. If at 302, it is determined that the at least one attribute of the solution element does not match with the pre-defined attribute, then at 304 the solution element is not evaluated and a corresponding state of the solution element is updated.

Further, if at 302 it is determined that the attribute of the solution element matches the pre-defined attribute, then at 306, the solution element is evaluated for the constraint. Evaluation of the solution element is explained in detail in conjunction with FIG. 1.

At 308, it is determined if there is a violation of the constraint. If at 308, it is determined that there is no violation, then at 310, a violation metric is not generated and a corresponding state of the solution element is updated. Further, if at 208 it is determined that there is a violation of the constraint then at 312 a violation metric is generated and the state is updated accordingly.

Thus, the constraint is selectively applied to the solution element based on the attribute associated with it. Further, based on the violation metric generated the optimized solution varies accordingly. Therefore, it must be decided whether the violation metric that is generated at 310 should be considered for generating the optimized solution.

Thus, at 314, it is determined if the generated violation metric has to be selected. The violation metric is selected based on a first pre-defined criterion. In an embodiment of the invention, the first pre-defined criterion may be selecting the violation metric if the generated violation metric is in a pre-defined range. In another embodiment of the invention, the first pre-defined criterion is selecting the violation metric based on the time corresponding to the solution element at the sequence position for which the violation metric is generated. For example, in manufacturing units, the first pre-defined criterion may be to discard the generated violation metric during the night shifts.

If at 314 the violation metric is selected, then the violation metric is transformed into a cost at 316. Further, if the violation metric is not selected at 314, then at 318 the violation metric is discarded. In other words, the generated violation metric is not used to generate the cost. Similarly, each solution element is evaluated. The flowchart described above is further explained with an example explained in conjunction with FIG. 4.

FIG. 4. depicts an example of evaluating one or more solution elements of a solution for a constraint in accordance with an exemplary embodiment of the invention.

An initial solution for scheduling four cars for manufacturing on a single assembly line is considered. The solution is represented by a sequence 'A A B B'. Herein, A represents 'white colored cars' and B represents 'red colored cars'. The attributes for each solution element of the sequence are for example, color of the car, model of the car . . . , etc. In this example, all the cars in the sequence have moon roofs.

The solution is evaluated for a constraint, 'back to back moon roofs are not allowed'. In addition, the constraint has to be applied to red colored cars only. Accordingly, the pre-defined attribute is 'red color'. State corresponding to the moon roof car is represented by 'MR'.

As explained earlier in FIG. 3, the attribute of the first solution element of the sequence, i.e., A (white colored car) is checked with the pre-defined attribute. Since, A is a white colored car, the first pre-defined attribute criterion is not met, and accordingly, first solution element (A) in the sequence is not evaluated for the constraint. However, the corresponding state is updated. It may be apparent to any person skilled in the art that since A is the first solution element in the sequence and is not evaluated, the state is updated as 'null state/0'. Thereafter, as the second solution element in the sequence is also a white colored car, the second solution element is not evaluated. Further, the state of the second solution element is updated as the state for the first solution element, i.e. null state/0. Furthermore, no violation metric is generated for the both the solution elements (A and A).

Thereafter, third solution element B is evaluated as it is a red colored car and it matches the pre-defined attribute. Further, the state and the corresponding violation metrics are updated. The state is updated as 'MR', since the third solution element represents a moon roof car. Furthermore, the violation metric generated for the third solution element is 'zero' as the constraint is not violated. Subsequently, the fourth solution element B is also evaluated and the corresponding state and violation metric is updated. The state is updated as 'MR'. However, the fourth solution element violates the constraint. Thus, a violation metric 'X' is generated accordingly.

Figure 5A:
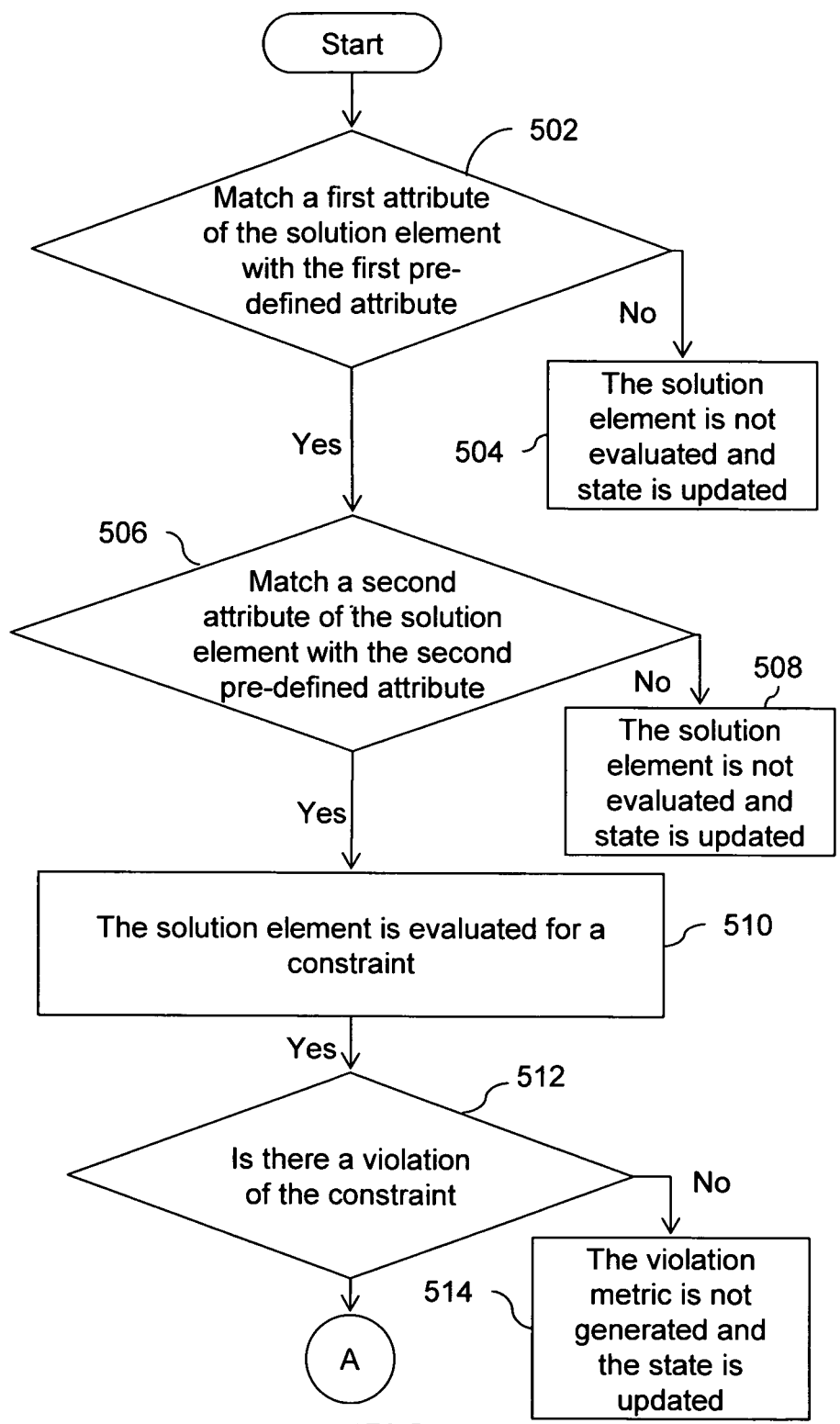
FIGS. 5a and 5b depict a flowchart illustrating evaluation of one or more solution elements of a solution for a constraint in accordance with another embodiment of the invention.
Figure 5B:
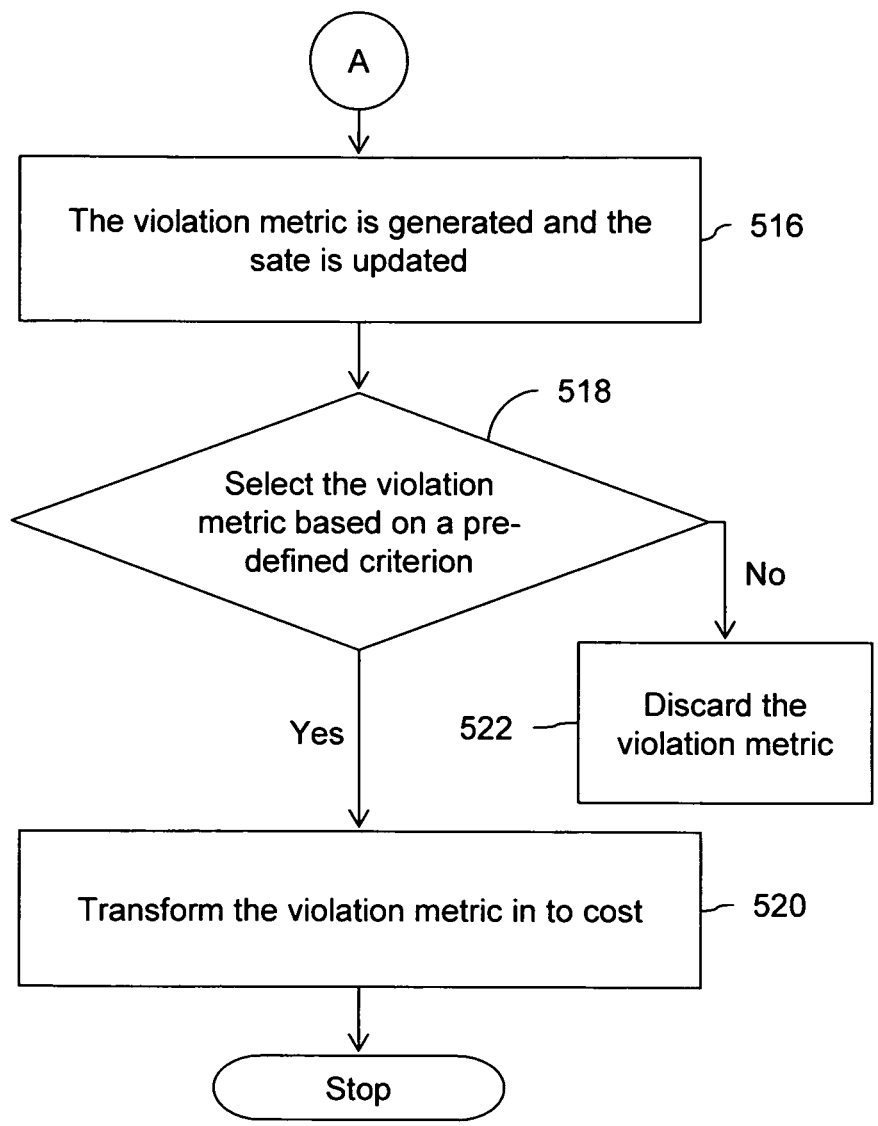

FIGS. 5a and 5b is a flowchart illustrating evaluation of one or more solution elements of a solution for a constraint in accordance with another embodiment of the invention.

In an embodiment of the invention, there may be more than one assembly line in a manufacturing unit. Further, each assembly line manufactures the car in a separate fashion by adhering to a separate set of constraints. For example, a particular constraint need not be applicable to a first assembly line but is applicable to a second assembly line in the manufacturing unit. Further, an evaluation of a solution element under such environment is explained below.

At 502, a first attribute of a solution element is matched with a first pre-defined attribute. For example, the first attribute may be 'assembly line 1'. If at 502, it is determined that the first attribute of the solution element does not match with the first pre-defined attribute, then at 504, the solution element is not evaluated and corresponding state of the solution element is updated.

Further, if the first attribute of the solution element matches the first pre-defined attribute at 502, then at 506, a second attribute of the solution element is matched with a second pre-defined attribute of the solution element. For example, the second attribute may be 'color' of the car. If at 506 it is determined that the second attribute of the solution element does not match the second pre-defined attribute, then at 508, the solution element is not evaluated and the corresponding state of the solution element is updated. However, if the second attribute of the solution element matches the second pre-defined attribute at 506, then the solution element is evaluated for the constraint at 510. The evaluation of the solution element has been explained in detail in conjunction with FIG. 1 and FIG. 2.

At 512, it is determined if the constraint is violated by the solution element. If at 512, it is determined that the constraint is not violated, then at 514 a violation metric is not generated and corresponding state of the solution element is updated. However, if at 512, it is determined that the constraint is violated by the solution element, then at 516 a violation metric is generated and a corresponding state of the solution element is updated.

Thus, at 518, it is determined if the generated violation metric has to be selected. The violation metric is selected based on a first pre-defined criterion. In an embodiment of the invention, the first pre-defined criterion may be selecting the violation metric when the generated violation metric is in a pre-defined range. In another embodiment of the invention, the first pre-defined criterion is selecting the violation metric based on the time the violation metric is generated. For example, in manufacturing units, the first pre-defined criterion may be to discard the generated violation metric during the night shifts.

If at 518 the violation metric is selected, then the violation metric is transformed into a cost at 520. Further, if the violation metric is not selected at 518, then at 522 the violation metric is discarded. In other words, the generated violation metric is not used to generate the cost. Similarly, each solution element is evaluated. The flowchart described above is further explained with an example explained in conjunction with FIG. 6.

FIG. 6 depicts an example of evaluating one or more solution elements of a solution for a constraint in accordance with an exemplary embodiment of the invention.

An initial solution for scheduling six cars for manufacturing on two different manufacturing assembly lines is considered. The solution is represented by a sequence 'A1 A2 B1 B2 A3 A4'. Herein, A1, A2, A3 and A4 represent cars associated with assembly line 1 (Line1) and, B1 and B2 represent cars associated with assembly line 2 (Line2). Further, A1 and A4 are 'white colored cars', and A2, B1, B2, A3 are 'red colored cars'. Therefore, the attributes for each solution element of the sequence are for example, color of the car, associated assembly line . . . , etc. Furthermore, A4 is a non moon roof car, and A1, A2, B1, B2 and A3 are moon roof cars.

As explained earlier, the solution is evaluated for a constraint. The constraint considered in the current example 'Back to back moon roofs are not allowed' is applicable only to red cars on 'Line1'. Accordingly, the first pre-defined attribute is 'Line 1' and the second pre-defined attribute is 'red.' State corresponding to the moon roof car is represented by 'MR'.

Following the current example and as described in FIG. 5, the first attribute of first solution element A1 matches the first pre-defined attribute (Line1) however, the A1 is a white colored car, hence it is not evaluated and the state is updated as '0' and violation metric is updated as 'Zero/O'. It may be apparent since A1 is the first solution element, its initial state must be a 'null state/O' and since it is not evaluated, the state is updated as 'null state/0' again. Further, the violation metric is zero as A1 was not evaluated for the constraint.

Thereafter, A2 matches the first pre-defined attribute and since A2 is a 'red colored car', it is evaluated and corresponding state and violation metric is updated. Further, since A2 is a moon roof car, the state is updated as 'MR'. However, no violation metric is generated as the constraint is not violated.

After the evaluation of A2, B1 and B2 are not evaluated as B1 and B2 do not belong to 'Line1', thereby not satisfying the first pre-defined attribute. Further, states corresponding to the solution elements are updated. In various embodiments of the invention, the state to be considered for the evaluation of the solution element is reset for the solution element when solution element to be evaluated is from a different assembly line. It may be apparent to any person skilled in the art that the state to be considered for evaluation of the solution element will differ for two different assembly lines. In the current example, since B1 is the first solution element in the sequence associated with the assembly line 2, its initial state is considered as 'null state/0'. However, B1 is not evaluated and the state is updated as 'null state/0' again. Similarly, state of B2 is updated based on B1.

Further, the state considered for evaluation of the solution element associated with an assembly line is considered as the state of the previous solution element of the same assembly line. Thus, when the next solution element A3 matches the first pre-defined attribute, the state is reset and the state considered for evaluation of A3 is 'MR' (state of A2). Further, A3 is a 'red colored car' and hence it is evaluated and a corresponding state and violation metric is generated. Since, the constraint is violated a violation metric X (depicted in FIG. 6), is generated and the state is updated as 'MR'. Similarly, A4 is not evaluated since the second attribute of A4 does not match with the second pre-defined attribute.

Figure 7:
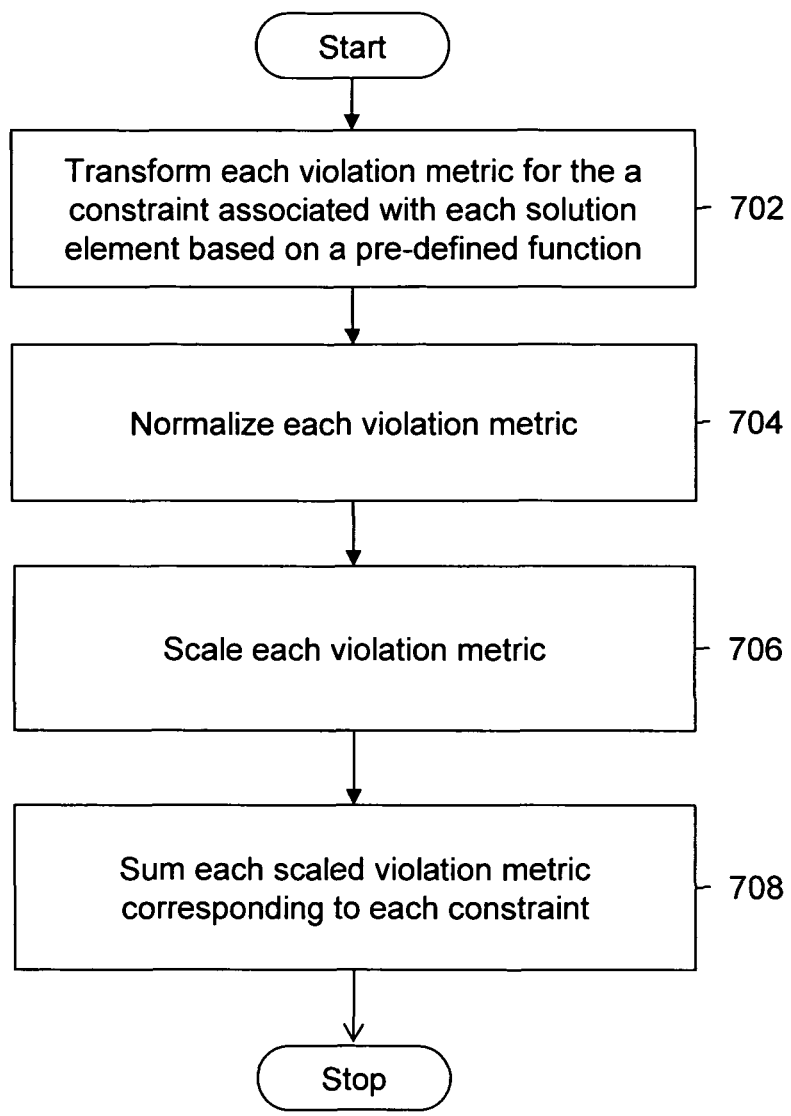
FIG. 7 depicts a flowchart illustrating a method for generating a cost associated with a solution/candidate solution in accordance with an embodiment of the invention.

FIG. 7 depicts a flowchart illustrating a method for generating a cost associated with a solution/candidate solution, in accordance with an embodiment of the invention.

In various embodiments of the invention, a cost is generated for a solution/candidate solution. Further, the cost is generated based on a violation metric associated with each solution element for a constraint. For example, the violation metric of the solution element is '20'. Further, the constraint may have a pre-defined range, such as min=5; max=10. The generation of the cost is explained in detail below.

At 702, each violation metric associated with each solution element of the solution is transformed based on a pre-defined function. The violation metric is transformed to '10' based on a pre-defined function. In the current example, the violation metric deviates by '10' (20-10) as max=10 and violation metric=20. A sample pre-defined function is to take the square of the deviation, $10^2=100$. More generally, the pre-defined function $f(x)$ can be of the form $x^n$, where n is the severity factor=0, 1, 2 and so on. In various embodiments of the invention, the violation metric is numeric.

At 704, each transformed violation metric is normalized. In various embodiments of the invention, the transformed violation metrics are normalized in order to remove the effect of intrinsic variations in the magnitude of the violation metric. In an exemplary embodiment of the invention, the violation metric is transformed by raising it to the power of the severity factor and then divided by the total penalty of the constraint. One example of the total penalty that can be used is as follows:

$$\text{Total penalty} = \sum_i^K w_i \left( \sum_j^{m_i} d_j^{n_i} \right)^{1/n_i}$$

Where K=number of constraints
$w_i$=weight or scaling factor for constraint i
$m_i$=number of violations for constraint i
$d_j$=jth deviation for constraint i
$n_i$=severity factor for constraint i Further, the severity factor is pre-defined by a user. In various embodiments of the invention, the transformed violation metric is numeric At 706, each normalized violation metric is scaled based on a corresponding priority associated with the constraint. In the current example, the normalized violation metric is scaled based on a pre-defined formula, i.e. the result from 704 * priority associated with the constraint. In various embodiments of the invention, the result is numeric. In an embodiment of the invention, the priority of the solution element is numeric value pre-defined by the user.

At 708, summing each scaled violation metric generated for each solution element corresponding to each constraint generates the cost associated with the solution/candidate solution.

In an embodiment of the invention, the method described in FIG. 1, FIG. 3, FIG. 5 and FIG. 7 is performed by a processor of a computer system. Further, the states and the violation metrics are stored in a memory of the computer system. Furthermore, the methods described in FIG. 1, FIG. 3, FIG. 5 and FIG. 7 are implemented in JAVA. It may be apparent to any person skilled in the art that, the methods can be implemented in programming languages like C, C++, C#, PERL, and the like.

In another embodiment of the invention, the method described in FIG. 1, FIG. 3, FIG. 5 and FIG. 7 can also be implemented in hardware. It may be implemented in an integrated circuit or part of an integrated circuit, such as an application specific integrated circuit, field programmable gate arrays, programmable logic arrays, and full-custom integrated circuits.

The method described above have several advantages. The method enables the incremental evaluation by integrating the concept of states with the constraint. This enables the incremental evaluation to be independent of the nature of constraints and the manner in which the local changes were made to a solution/candidate solution. Thus, this reduces the cost of developing the software and thereby it is less time consuming. Further, such incremental evaluation speeds up the computational speed and does not require any human intervention. Furthermore, the optimized solution generated is error-free. The method also enables selective application of the constraints, which avoids unnecessary evaluation and thus increasing the computational speed.

The methods and systems as described above can be implemented in software (e.g., firmware), hardware, or a combination thereof. In the currently contemplated best mode, the system is implemented in software, as an executable program, and is executed by a special or general purpose digital computer, such as a personal computer (PC; IBM-compatible, Apple-compatible, or otherwise), workstation, minicomputer, or mainframe computer.

Generally, in terms of hardware architecture, the computer includes a processor, memory, and one or more input and/or output (I/O) devices (or peripherals) that are communicatively coupled via a local interface. The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor is a hardware device for executing software, particularly that stored in memory. The processor can be any custom made or commercially available processor, a central processing unit (CPU), an auxiliary processor among several processors associated with the computer, a semiconductor based microprocessor (in the form of a microchip or chip set), a microprocessor, or generally any device for executing software instructions.

The memory can include any one or combination of volatile memory elements (e.g., random access memory (RAM), such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor.

The software in memory may include one or more separate programs, each of which comprises an ordered listing of executable instructions for implementing logical functions. In keeping with the examples provided, the software in memory includes the optimization system in accordance with the present invention and a suitable operating system. The operating system essentially controls the execution of other computer programs, such as the optimization system, and provides scheduling, input-output control, file and data management, memory management, and communication control and related services.

The optimization system is a source program, executable program (object code), script, or any other entity comprising a set of instructions to be performed. When a source program, then the program needs to be translated via a compiler, assembler, interpreter, or the like, which may or may not be included within the memory so as to operate properly in connection with the O/S. Furthermore, the optimization system can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer is a PC, workstation, or the like, the software in the memory may further include a basic input output system (BIOS\. The BIOS is a set of essential software routines that initialize and test hardware at startup, start the O/S, and support the transfer of data among the hardware devices. The BIOS is stored in ROM so that the BIOS can be executed when the computer is activated.

When the computer is in operation, the processor is configured to execute software stored within the memory, to communicate data to and from the memory, and to generally control operations of the computer pursuant to the software. The optimization system and the O/S, in whole or in part, but typically the latter, are read by the processor, perhaps buffered within the processor, and then executed.

When the optimization system is implemented in software it should be noted that the optimization system can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The optimization system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the optimization system is implemented in hardware, the optimization system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for generating an optimized solution for a process in a manufacturing unit, the method comprising:
    a. evaluating at least one solution comprising a plurality of solution elements associated with the process based on a set of constraints, the set of constraints corresponding to any number of constraints taken collectively, the at least one solution representing a sequence of the plurality of solution elements, each solution element having one or more attributes, the at least one solution being generated using a pre-defined algorithm, wherein at least one solution element of the plurality of solution elements is evaluated based on a corresponding at least one attribute of the at least one solution element of the plurality of solution elements;
    b. generating a first violation metric and a first state for each solution element of the plurality of solution elements, the first state and the first violation metric being generated corresponding to at least one constraint based on a first pre-defined criterion, wherein the first state is generated based on a first state of a solution element positioned prior to the solution element of the plurality of solution elements in sequence for at least one constraint;
    c. generating a candidate solution by modifying at least one sequence position of one or more solution elements in the at least one solution;
    d. evaluating the candidate solution at:
        i. each change point of a plurality of change points, each change point corresponding to a sequence position at which each solution element of the plurality of solution elements is modified, a solution element at the each change point being evaluated for the at least one constraint of all the constraints based on a first state of a solution element positioned prior to the solution element in the sequence, and the corresponding at least one attribute, wherein a new state and a new violation metric corresponding to all the constraints for the solution element at the corresponding each change point of the plurality of change points is generated;
        ii. one or more solution elements positioned subsequent to each change point of the plurality of change points corresponding to the at least one constraint, wherein the evaluation at the one or more solution elements is performed until at least one solution element of the one or more solution elements has a new state different from a corresponding first state, wherein each solution element is evaluated based on a corresponding at least one attribute and a violation metric is generated for each of evaluated solution element;
    e. testing the candidate solution based on an acceptance criterion;
    f. updating the first violation metric and the first state associated with each solution element corresponding to each change point and the at least one solution element of one or more subsequent solution elements when the candidate solution is selected after testing;
    g. repeating steps c, d, e and f for a pre-defined number of times, wherein the at least one solution is replaced with the selected candidate solution; and
    h. outputting an optimized solution, wherein the optimized solution is the selected candidate solution after a pre-defined number of iterations.

2. The method according to claim 1, wherein the at least one solution element of the at least one solution is evaluated when at least one attribute of the at least one solution element matches at least one pre-defined attribute, the at least one solution element being evaluated for a constraint.

3. The method according to claim 1, wherein the at least one solution element of the candidate solution is evaluated when at least one attribute of the at least one solution element matches a pre-defined attribute, the at least one solution element being evaluated for a constraint.

4. The method according to claim 1, wherein updating the first violation metric is performed based on the first pre-defined criterion.

5. The method according to claim 1, wherein the acceptance criterion comprises a cost associated with the candidate solution being either less than or equal to a pre-defined cost, the calculation of the cost comprises:
    a. transforming each violation metric associated with each solution element of the candidate solution, each violation metric being transformed based on a pre-defined function, each violation metric being associated with a corresponding constraint;
    b. normalizing each transformed violation metric;
    c. scaling each normalized violation metric based on a priority associated with a corresponding constraint; and
    d. summing a scaled violation metric corresponding to each constraint to generate the cost associated with the candidate solution.

6. A non-transitory computer program product for use with a stored program computer, the computer program product comprising a non-transitory computer readable medium having a computer readable program code embodied therein for generating an optimized solution for a process in a manufacturing unit, the computer readable program code performing:
    a. evaluating at least one solution comprising a plurality of solution elements associated with the process based on a set of constraints, wherein the set of constraints corresponds to any number of constraints taken collectively, the at least one solution representing a sequence of the plurality of solution elements, each solution element having one or more attributes, the at least one solution being generated using a pre-defined algorithm, wherein at least one solution element of the plurality of solution elements is evaluated based on a corresponding at least one attribute of the at least one solution element of the plurality of solution elements;
    b. generating a first violation metric and a first state for each solution element of the plurality of solution elements, the first state and the first violation metric being generated corresponding to at least one constraint based on a first pre-defined criterion, wherein the first state is generated based on a first state of a solution element positioned prior to the solution element of the plurality of solution elements in sequence for at least one constraint;
    c. generating a candidate solution by modifying at least one sequence position of one or more solution elements in the at least one solution;

d. evaluating the candidate solution at:
  i. each change point of a plurality of change points, each change point corresponding to a sequence position at which each solution element of the plurality of solution elements is modified, a solution element at each change point being evaluated for the at least one constraint of all the constraints based on a first state of a solution element positioned prior to the solution element in the sequence, and the corresponding at least one attribute, wherein a new state and a new violation metric corresponding to all the constraints for the solution element at the corresponding each change point of the plurality of change points is generated;
  ii. one or more solution elements positioned subsequent to each change point of the plurality of change points corresponding to the at least one constraint, wherein the evaluation at the one or more solution elements is performed until at least one solution element of the one or more solution elements has a new state different from the corresponding first state, wherein each solution element is evaluated based on the corresponding at least one attribute and a violation metric is generated for each of evaluated solution element;
e. testing the candidate solution based on an acceptance criterion;
f. updating the first violation metric and the first state associated with each solution element corresponding to each change point and the at least one solution element of the one or more subsequent solution elements when the candidate solution is selected after testing;
g. repeating steps c, d, e and f for a pre-defined number of times, wherein the at least one solution is replaced with the selected candidate solution; and
h. outputting an optimized solution, wherein the optimized solution is the selected candidate solution after a pre-defined number of iterations.

7. The non-transitory computer program product of claim 6, wherein the at least one solution element of the at least one solution is evaluated when at least one attribute of the at least one solution element matches a pre-defined attribute.

8. The non-transitory computer program product of claim 6, wherein the at least one solution element of the candidate solution is evaluated when at least one attribute of the at least one solution element matches a pre-defined attribute.

9. The non-transitory computer program product of claim 6, wherein updating the first violation metric is performed based on a first pre-defined criterion.

10. The non-transitory computer program product of claim 6, wherein the acceptance criterion comprises a cost associated with the candidate solution is either less or equal to a pre-defined cost, the calculation of the cost comprises:
  a. transforming each violation metric associated with each solution element of the candidate solution, each violation metric being transformed based on a pre-defined function, each violation metric being associated with a corresponding constraint;
  b. normalizing each transformed violation metric;
  c. scaling each normalized violation metric based on a priority associated with a corresponding constraint; and
  d. summing a scaled violation metric corresponding to each constraint to generate the cost associated with the candidate solution.

11. A system comprising:
i. a processor configured for:
  a. evaluating at least one solution comprising a plurality of solution elements associated with the process based on a set of constraints, the set of constraints corresponding to any number of constraints taken collectively, the at least one solution representing a sequence of the plurality of solution elements, each solution element having one or more attributes, the at least one solution being generated using a pre-defined algorithm, wherein at least one solution element of the plurality of solution elements is evaluated based on the corresponding at least one attribute of the at least one solution element of the plurality of solution elements;
  b. generating a first violation metric and a first state for each solution element of the plurality of solution elements, the first state and the first violation metric being generated corresponding to at least one constraint based on a first pre-defined criterion, wherein the first state is generated based on a first state of a solution element positioned prior to the solution element of the plurality of solution elements in the sequence for the at least one constraint;
  c. generating a candidate solution by modifying at least one sequence position of one or more solution elements in the at least one solution;
  d. evaluating the candidate solution at:
    i. each change point of a plurality of change points, each change point corresponding to a sequence position at which each solution element of the plurality of solution elements is modified, a solution element at each change point of the plurality of change points being evaluated for the at least one constraint of all the constraints based on a first state of a solution element positioned prior to the solution element in the sequence, and the corresponding at least one attribute, wherein a new state and a new violation metric corresponding to all the constraints for the solution element at the corresponding each change point of the plurality of change points is generated;
    ii. one or more solution elements positioned subsequent to each change point of the plurality of change points corresponding to the at least one constraint, wherein the evaluation at the one or more solution elements is performed until at least one solution element of the one or more solution elements has a new state different from the corresponding first state, wherein each solution element is evaluated based on the corresponding at least one attribute and a violation metric is generated for each of evaluated solution element;
  e. testing the candidate solution based on an acceptance criterion;
  f. updating the first violation metric and the first state associated with each solution element corresponding to each change point and the at least one solution element of the one or more subsequent solution elements when the candidate solution is selected after testing;
  g. repeating steps c, d, e and f for a pre-defined number of times, wherein the at least one solution is replaced with the selected candidate solution; and
  h. outputting an optimized solution, wherein the optimized solution is the selected candidate solution after a pre-defined number of iterations; and
ii. a memory configured for storing the first state, the first violation metric, the new state, the new violation metric, the at least one solution, the candidate solution, the acceptance criterion, wherein the memory is operatively coupled with the processor.

12. The system of claim 11, wherein the at least one solution element of the at least one solution is evaluated when at least one attribute of the at least one solution element matches a pre-defined attribute.

13. The system of claim 11, wherein the at least one solution element of the candidate solution is evaluated when at least one attribute of the at least one solution element matches a pre-defined attribute.

14. The system of claim 11, wherein updating the first violation metric is performed based on a first pre-defined criterion.

15. The system of claim 11, wherein the acceptance criterion comprises a cost associated with the candidate solution is less or equal to a pre-defined cost, the calculation of the cost comprises: a. transforming each violation metric associated with each solution element of the candidate solution, each violation metric being transformed based on a pre-defined function, each violation metric being associated with a corresponding constraint; b. normalizing each transformed violation metric; c. scaling each normalized violation metric based on a priority associated with a corresponding constraint; and d. summing a scaled violation metric corresponding to each constraint to generate the cost associated with the candidate solution.

* * * * *